United States Patent [19]

Desage et al.

[11] Patent Number: 5,075,121
[45] Date of Patent: Dec. 24, 1991

[54] METHOD FOR THERMAL TREATMENT OF ALIMENTARY SUBSTANCES

[75] Inventors: Robert Desage, Verneuil; Patricia Fraile, Champagne; Henri Renon, Sceaux, all of France

[73] Assignee: A.R.M.I.N.E.S., Paris Cedex, France

[21] Appl. No.: 328,835

[22] Filed: Mar. 27, 1989

[30] Foreign Application Priority Data

Mar. 29, 1988 [FR] France ............................ 88 04095

[51] Int. Cl.$^5$ .................................................. A23L 1/00
[52] U.S. Cl. ........................................ 426/233; 426/510
[58] Field of Search ................ 426/510, 231, 233, 511

[56] References Cited

U.S. PATENT DOCUMENTS 3,858,029  12/1974  Walter ................................... 219/401
3,902,044   8/1975  Doyle et al. .......................... 219/401
4,011,805   3/1977  Vegh et al. ............................ 426/510
4,419,568  12/1983  Van Overloop ...................... 219/401

Primary Examiner—George Yeung
Attorney, Agent, or Firm—Sandler, Greenblum & Bernstein

[57] ABSTRACT

Process and apparatus are provided for cooking an alimentary substance within a walled enclosure under atmospheric pressure by means of steam entering into the enclosure. The method and apparatus provide for a first cooking step which includes the rapid increase of the temperature of the surface of the substance by means of superheated steam to preheat the substance, with the steam being supplied into the enclosure at a temperature above the boiling temperature of water and under atmospheric pressure; and a second cooking step wich includes drying the surface of the substance and cooking it, in continuation of the first step.

23 Claims, 8 Drawing Sheets

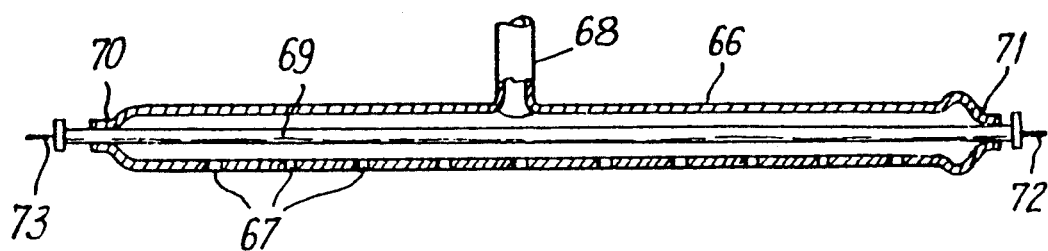
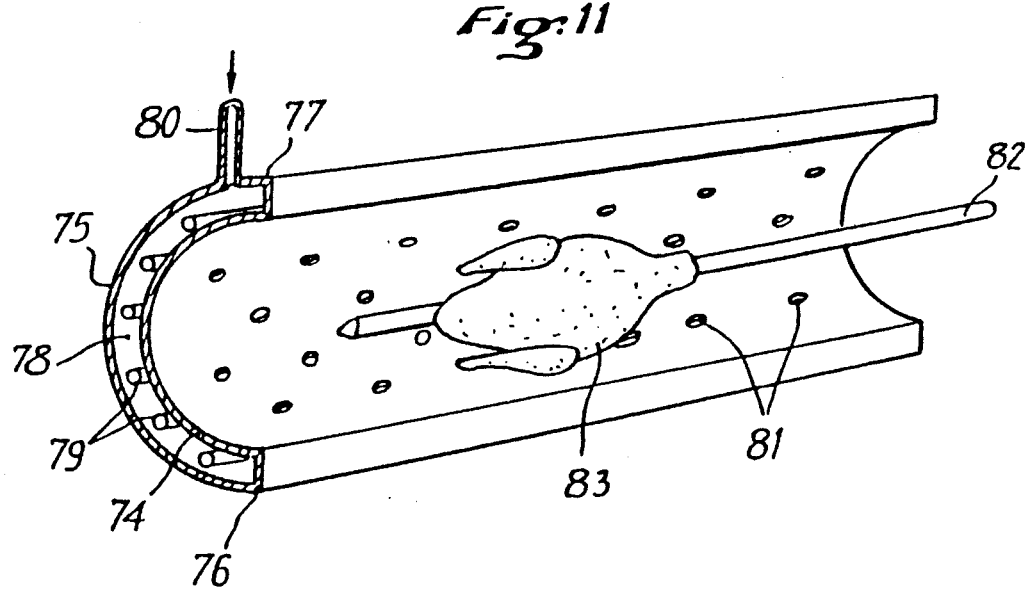

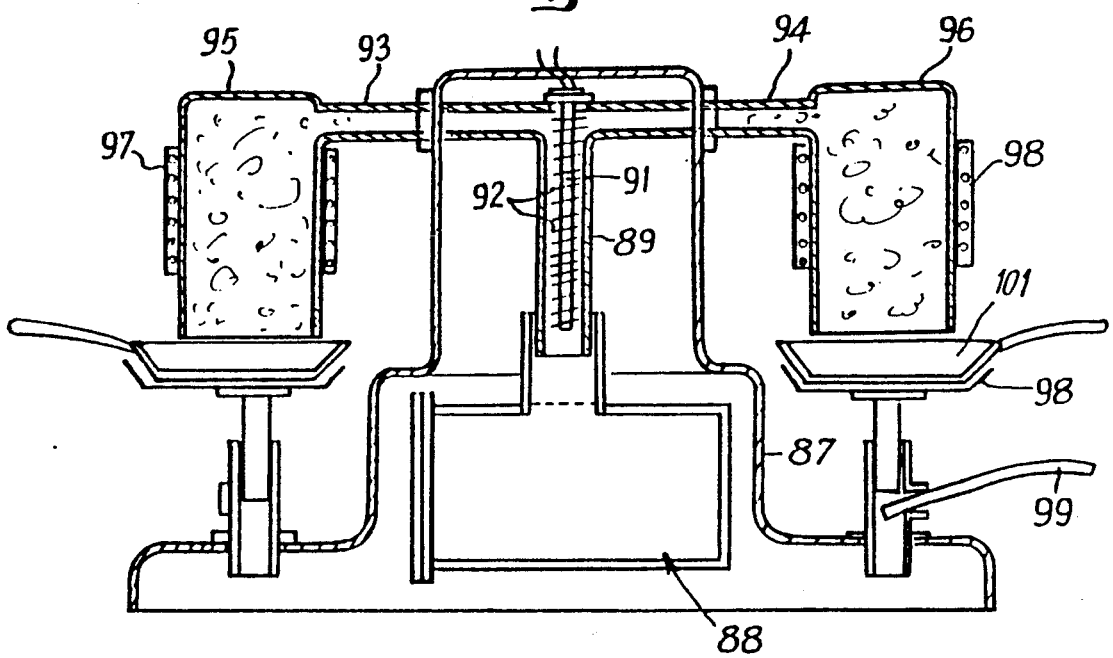
Fig. 12
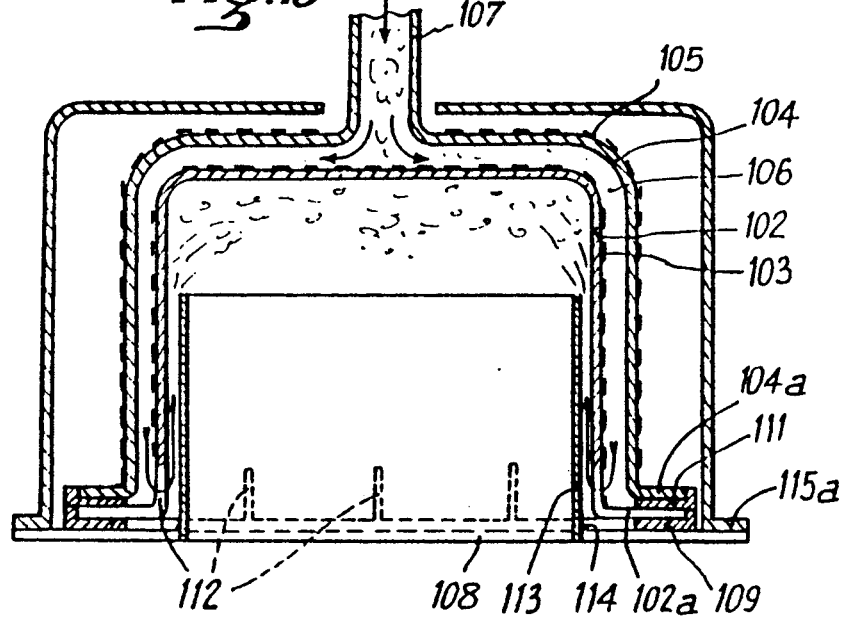
Fig. 13
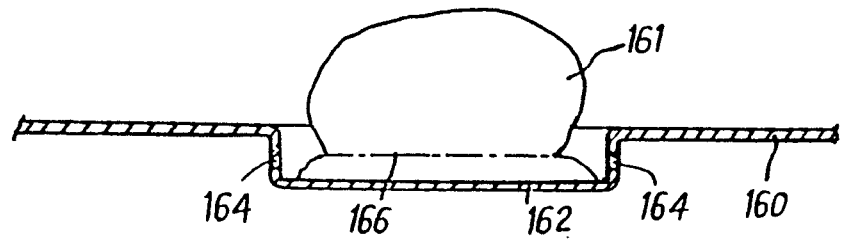

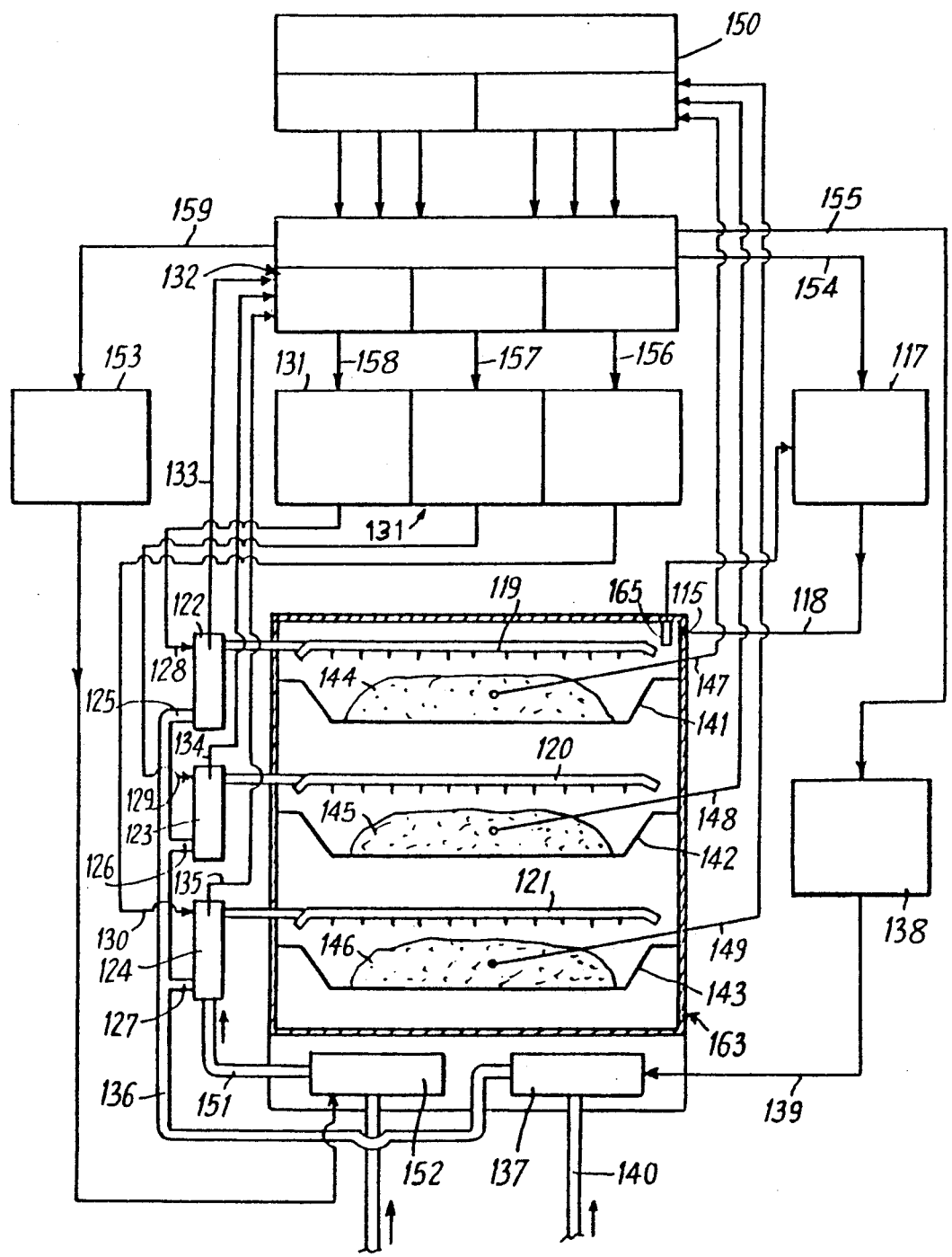

METHOD FOR THERMAL TREATMENT OF ALIMENTARY SUBSTANCES

The present invention is concerned with a process and a formal treating apparatus for preparation, cooking and reheating alimentary substances by means of steam.

In the homes, in restaurants, cafeterias and in the agri-foodstuffs industry there are generally employed various apparatus which range from a simple casserole laid upon a heating plate, for example, up to cooking enclosures having variable capacities, ranging from mini-ovens to high-power ovens, by-way of electric grills or still, for example, hot-dog apparatus, as well as, for example, tunnel ovens. In the organization of these apparatus, the foodstuffs can undergo various and different treatments which amount to either a preparation (whitening or poaching for example), or a cooking (frying or roasting for example), or still the reheating of precooked foods for example.

All these devices used, according to the object sought and the kinds of cooking to be effected, different means for propagating heat; that is to say: conduction, the radiation of an electric resistance connected or not to a natural or forced convection, electro-magnetic radiation, simple or combined with the previous means; inductive action and cooking by steam.

For cooking with steam, there are known cookers operating under pressure or not, which range from a pressure-cooker to the steam-oven of a restaurant or industrial type as well as simmering devices having several compartments whose lowest contains water which is boiled. Additionally, there are also used many ovens or restaurant-type ovens which combine steam with the radiation of a resistance or the forced convection of hot air or the combination of these two means.

Actually this method of propagating heat by using steam, while energy efficient preserves the different nutrients, however it has the drawback of not allowing broiling and practically is used only for the reheating, the simmering and the cooking of fish, because of too much condensation. Additionally steam often is dangerous because of the risk of explosion it entails when used under pressure.

There exists also another series of apparatus described in patents of which no commercial development used for cooking foods is presently known.

Patent CH-A-453617 is concerned with an automatic system for regulating an enclave, by mixing compressed air and steam in order to limit the introduction of steam to the strict minimum necessary for the upkeep of the desired temperature. In patents FR-A-2 201 747, FR-A-2 593 587 and EP-A-O 191267 the apparatus described are composed only of a heater, integrated or not to a steam generator, operating at atmospheric pressure within a range of temperature comprised between 100° C. and 450° C. This system is integrated or not with the cooking enclave toward which is directed the superheated steam thus produced. In the case of the FR-A-2 593 587 patent, this superheated steam is directed toward electrical resistances located at the bottom and the top inside the enclave.

If the apparatus according to the previously mentioned patents make it possible to obtain superheated steam within a relatively wide temperature range, none of them mentions a variable steam flow, nor an independent and adjusted heating of the walls of the enclave in order to compensate for thermal losses so that the steam preferentially yields its caloric energy to the foodstuffs. This explains the need for these apparatus to provide superheated steam at a very high temperature (about 450° C.).

Additionally, patent FR-A-1114398 is the only one to give results with the use of the apparatus described for the purpose of cooking food. In this patent, the cooking process described consists in a combination of means making it possible to obtain, within the inside of a hermetically closed enclosure, steam within a temperature range comprised between 118° C. and 300° C. and a range of pressure varying between vacuum, atmospheric pressure and a maximum pressure of 4.9 bars and preferably 0.98 bar. According to the types of food, cooking takes place at temperatures near those used for traditional cooking: 200°-240° C. for meat and 120°-140° C. for vegetables. The cooking cycle is divided into three successive phases comprising a first phase during which the food is boiled under pressure to about 200° C. for meat, followed by a frying process at atmospheric pressure and at a temperature slightly higher (about 230° C.) and finally frying under the vacuum, the walls of the enclosure remaining near 230° C. When frying is not desired, for vegetables for example, the first phase at about 140° C. is used alone or in combination with vacuum for a very short time and wall temperatures near 140° C. No information concerning the size of the samples treated is given and consequently it is very difficult to compare these results with other types of cooking.

Bearing in mind these results, it seems that pressure is harmful for the cooking time since the best results are obtained with moist steam.

It should be noted that in a sauce pan, cooking of potatoes having a diameter of 4 cm requires 10 to 12 minutes starting with the turning of the valve, which represents about 20 to 25 minutes of a total cooking time. The result given in the patent therefore should be noted with precaution.

It can be concluded that if the sophistication of the apparatus of patent FR-A-1114398, which comprises heating means, pressure means and vacuum means appears to bring a significant improvement on the outward appearance of the food by comparison with other devices operating under pressure it does not make it possible to realize other types of cooking, in particular pastries. Owing to its complex realization, it is relatively expensive and accordingly it would be difficult for it to reach the small restaurants' market and that intended for the public at large.

All the apparatus known, commercial or not, have technical problems (design, use, yield, etc), with respect with different types of cooking and also chimico-biological Problems with respect to the quality of the cooking and the upkeep of the different elements constituting these apparatus (self-cleaning ovens, for example).

The present invention aims at avoiding these problems by providing a process and an apparatus making it possible to obtain better cooking conditions better nutritional and organoleptic conditions in the cooked food, a substantial reduction in cooking time and a better energy efficiency.

To this effect, this process of preparing cooking and reheating a food is characterized in that this food is subjected within an enclosure under atmospheric pressure to a thermal treatment with steam, comprising one or several phases whose steam temperature enclosure wall and steam yield conditions are either defined during treatment in proportion to the difference in the temperature between the inside and the surface of the food, for the cooking desired, or, predefined by an operating program or a cooking recipe, established during previous trials and which can be controlled manually or automatically.

During its tranfer between a steam generator and a treating enclosure, the steam is superheated within a temperature range comprised, preferably, between 100° C. and 300° C. For a given type of treatment the steam temperature preferably is adjusted within the enclosure to the temperature at the outlet of the superheater as is that of the enclosures wall near the steam temperature.

According to the invention the food can be heated either by steam alone or by mixing of steam and an inert gas, such as air for example, when it is desired to carry up the process that a temperature below the boiling temperature of water under atmospheric pressure, that is to say, below 100° C.

By using, according to the invention, steam at a temperature comprised preferably within a temperature range of 100° C. to 300° C., to cook or reheat foods, there is advantageously obtained the possibility of in particular carrying grilling to obtain a grilled product which is quite similar to that obtained by heating with the radiation of a flame and without pyrolysing the food contrary to the instance where radiation or conduction which bring the surface to a temperature higher than required. This steam heating treatment makes it possible to retain the great majority of minerals and vitamins, to avoid weight losses, to preserve and to develop aromas, to retain structures and therefore to find again the natural taste of a food which is made up by the combination of the perceptions of odor, taste and consistency. The invention advantageously makes it possible to treat agricultural foods so that they may be consumed immediately (cooking, reheating, and defrosting for example) or to preserve them (sterilizing, pasteurizing) or still to prepare them for preservation in a gold atmosphere, such as by refrigeration, freezing, quick freezing, vacuuming or placing under an inert atmosphere, etc.

Other advantages accruing from the invention are that it makes it possible to obtain, readily, an excellent thermal efficiency, a very rapid increase in the temperature of the steam, to use much less steam and therefore to obtain less condensate, to use steam under atmospheric pressure in the entire temperature range, to have a cooking output which is much greater for the same volume of enclosure, to decrease the volume of the apparatus and consequently to cook foods inexpensively. By adjusting the temperature of the steam to a value which is relatively low with respect to that obtained near a source of thermal radiation, it is possible to concentrate the flow of this steam near the food, which makes it possible, among other things, to control properly the cooking times by using a temperature probe which measures the internal temperature of the food which becomes a measure of the cooking quality. Since practically no carbonized particles are found on the walls of the apparatus and with steam available, cleaning of the cooking enclosure and that of plates is greatly facilitated.

The invention can be used in all types of apparatus or devices ranging for example from the small household types to a built-in oven or still for example in commercial devices such as for example those in butcher shops, delicatessens, bars, restaurants or fabrication lines for industrial cooking. The apparatus according to the invention can be used to cook or reheat, for example, eggs or entrees, meats in the form of pieces to be roasted (roasts, poultry, game, ham, etc.) or in the form of roasts, gratins, vegetables, desserts as well as bread of any composition or bunches of breads. It is also possible to use the apparatus according to the invention to bring about the reheating of precooked meals or also to bring about the torrefaction of food products such as coffee, malt, cocoa, etc.

There will be described hereinbelow, by way of non limiting examples, various embodiments of the present invention, reference being had to the accompanying drawings in which:

FIG. 10 is an axial cross sectional view of a tubular type vapor distributor equipped with a heating source.

FIG. 11 is a perspective view of a steam distributor of the cylindrical type equipped with a heating source.

FIG. 12 is a vertical cross sectional view of an apparatus for cooking fondues.

FIG. 13 is a vertical cross sectional view of a cooking enclosure fitted with a tube for increasing steam temperature.

FIG. 14 is a schematic view of an installation comprising several ovens fed by steam from a common steam central.

Figure 1:
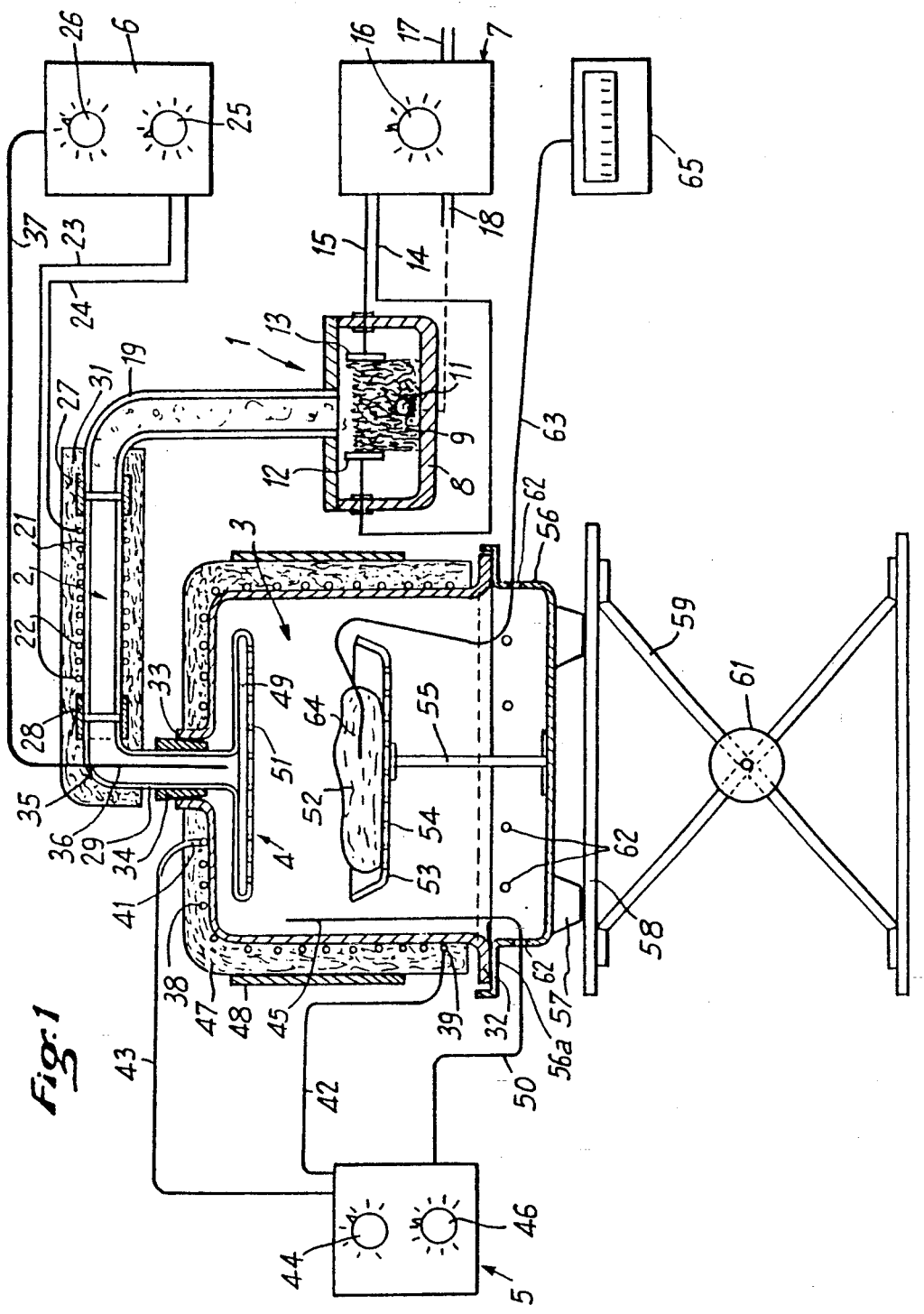
FIG. 1 is a vertical cross sectional view of an experimental apparatus for cooking or reheating food products according to the invention.

The apparatus for cooking or reheating foods according to the invention which is shown in FIG. 1 comprises essentially a steam generator 1, a device for increasing the steam temperature 2, an enclosure for cooking or reheating foods 3, a vapor distributor 4 and control devices 5, 6, 7 for regulating the operation of various parts of the apparatus.

The steam generator 1 which is used in the apparatus of the invention, is for example of the type which causes rapid vaporizing caused by passing an electrical current through a porous medium fitted with electrodes and with which it is possible to adjust the flow of steam produced at a ratio of 1 to 10 by admitting an amount of water going into the porous body controlled by adjusting the vaporizing current. This vapor generator 1 comprises an enclosure 8 within which is housed the porous body 9 fed at its lower part by water which diffuses therein through holes provided in a 11 tube fed with water. Associated with porous body 9 are two electrodes 12 and 13 facing one another with the porous body housed therebetween. The two electrodes 12, 13 are connected respectively through electrical conductors 14, 15 to two outlet terminals of a device 7 which controls the intensity of the vaporizing current. The control device 7 has an adjusting knob 16 for adjusting the intensity of the vaporizing current and for correlatively adjusting the flow of water between an inlet channel 17, connected to a city water outlet, and an outlet 18 connected to tube 11. Steam produced in generator 1 is at a temperature near 100° C. and is conveyed through a tube 19 to a device 2 for raising the temperature. The device 2 for raising the temperature of the steam is constituted by horizontal glass tube 21 for example of the "PYREX" type. Outside tube 21 is wound helically a heating resistance 22, glued to tube 21 by means of a varnish. The two ends of the heating resistance 22 are connected respectively by electric conductors 23, 24 to two output terminals of the control device 6. This device 6 comprises an adjusting knob 25 making it possible to adjust the power furnished to resistance 22 in proportion to the yield and the steam temperature which is set in order to obtain a good adjustment. The device 6 comprises another knob 26 which makes it possible to post or set the steam temperature desired between 100° C. and 300° C. The glass tube 21, carrying, on the outside, the heating resistance 22, is coupled, at its two extremities through sleeves 27, 28 which insure the tightness respectively of steam inlet tube 19 at a temperature near 100° C. and to a high temperature steam output 29. This assembly is thermally insulated along its entire surface by a coating of insulating fibers 31, for example alumina fibers, known as "KERLAN".

High temperature steam is let in by tube 29 into thermal treatment enclosure 3 for the foods. This enclosure, made for example from glass of the "PYREX" type is in the shape of a bell and has in its lower part, an external collar 32 along its entire periphery. In the center of its upper part it has an opening 33 in which is engaged a stopper 34 traversed vertically by pipe 29 connected to the temperature increasing device 2. In the elbow of tube 29 is provided a hole 35 traversed by a thermocouple 36. This thermocouple 36 extends vertically in the tube 29 up to the immediate facility of vapor distributor 4 to which is connected the tube 29 inside the cooking enclosure 3. Passage of the wall of the elbow 29 by thermocouple 36 is done through a stopper and this thermocouple 36 is connected through a conductor 37 to control device 6 to adjust the temperature by means of the control knob 26.

The cooking enclosure 3 is fitted on its outside surface by a heating resistance 38 glued by means of a varnish, whose winding begins at the lower extremity 39 near the lower collar 32 and ends at the upper end 41 at the top of the enclosure. The heating resistance 38 thus forms a helical coil around the vertical lateral wall of the enclosure 3 which is extended by a spiral winding on the upper horizontal wall of this enclosure. The two ends 39, 41 of the heating resistance 38 are connected respectively through electrical conductors 42, 43 to two output terminals of the control device 5 which makes it possible to adjust, by means of a knob 44, the electrical power provided to the heating resistance 38. This power is adjusted by maintaining the temperature level within a range of 100° C. to 300° C., and this temperature level is controlled by a probe 45 placed on the wall inside the cooking enclosure 3 which is connected by a conductor 50 to the control device 5 equipped with a temperature adjusting knob 46.

The cooking enclosure 3 is thermally insulated along its entire surface, by a coating 47 of insulating fibers such as those of alumina known by the name of "KERLAN". This enclosure and its thermal insulator 47 are maintained in place by a collar 48 which with the aid of a support gives it a fixed position.

The vapor distributor 4 which is located at the upper part of the cooking enclosure 3 is formed by a cavity 49 in which issues tube 29 and which is defined at its upper part by a horizontal wall perforated with holes 51 distributed uniformly on its entire surface in such a way that the steam produced be in slight excess pressure in order that it reaches a food to be cooked 52 located below the vapor distributor 4. This food 52 is led on a horizontal plate 53 perforated with holes 54 which are uniformly distributed along the entire surface of the plate. The plate 53 is supported by a vertical rod 55 secured to a lower container 56 having the same lower diameter as the cooking enclosure 3 and having an upper external collar 56a. This container 56 rests on feet 57 on a height-adjustable lift in order to raise or lower table 58 and the height of the lift 58 is adjusted by crossbars 59 operated by a knob 61 integral with a screw to raise or lower lift 58 and consequently plate 53 in cooking enclosure 3.

The vertical lateral wall of container 56 is perforated with holes 62 uniformly distributed along its periphery and substantially half-way up. Through one of these holes 62 passes conductor 50 connecting the temperature probe 45 located inside the cooking enclosure 3 to device 5 for maintaining the temperature. Through another hole 62 passes a conductor 63 extending between a probe temperature 64 fitting in the food to be cooked 52 and an apparatus 65 which measures the increase in temperature of the food.

The cooking apparatus which just has been described operates in the following manner: using knob 26 the desired steam temperature entering into distributor 4 is adjusted. Using knob 46 the desired temperature for the wall of the cooking enclosure 3 is adjusted. Using knobs 25 and 44 the electrical power fed to the heating resistance 21 of the device for increasing temperature 2 and 38 for the wall of the cooking enclosure 3 are adjusted. Also adjusted is the steam yield by means of knob 16. All these adjustments are made according to the type of foods to be cooked and the characteristics desired for each of the cooked foods.

Placing of the food to be cooked 52 is done as follows: with button 61 of the elevating table 59, table 58 on which rests container 56 is lowered. Rod 55 which holds at its upper end container 54 is maintained on this container. This assembly being completely free below the cooking enclave 3 which remains fixed, the food 52 is placed in the container 53 and the thermocouple 64 is then introduced into the food, preferably in the center thereof, in order to follow the evolution of the foods temperature during the entire operating cycle. Once this loading is effected, plate 58 and all the elements it carries are brought up until the upper external collar 56a of container 56 contacts the lower external collar 32 of the cooking enclosure 3.

Figure 2:
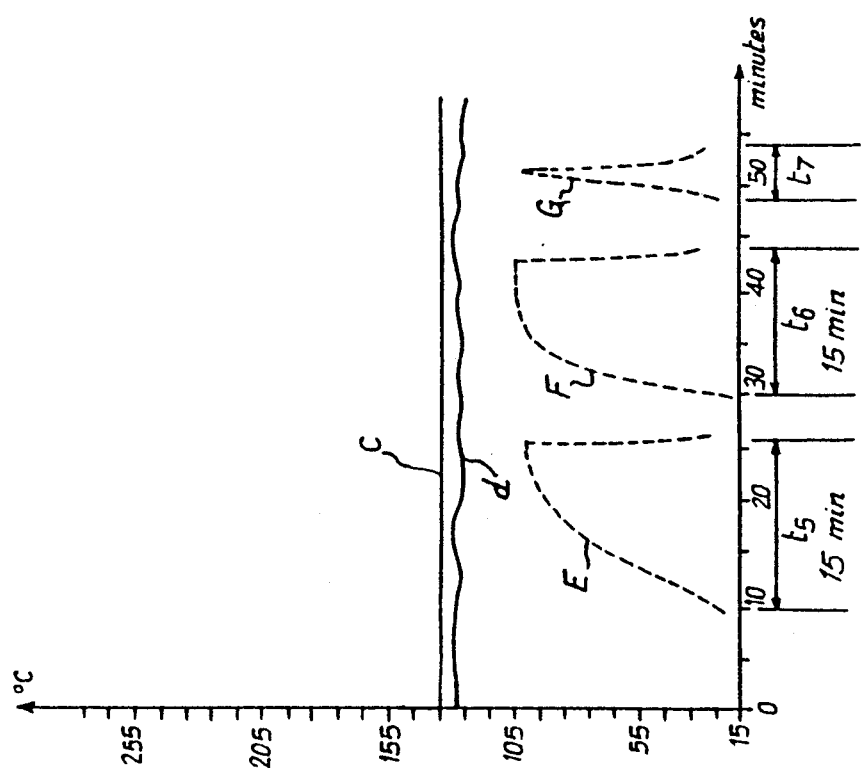
FIG. 2 is a diagram showing the variation in the temperature of various meats as a function of time.
Figure 3:
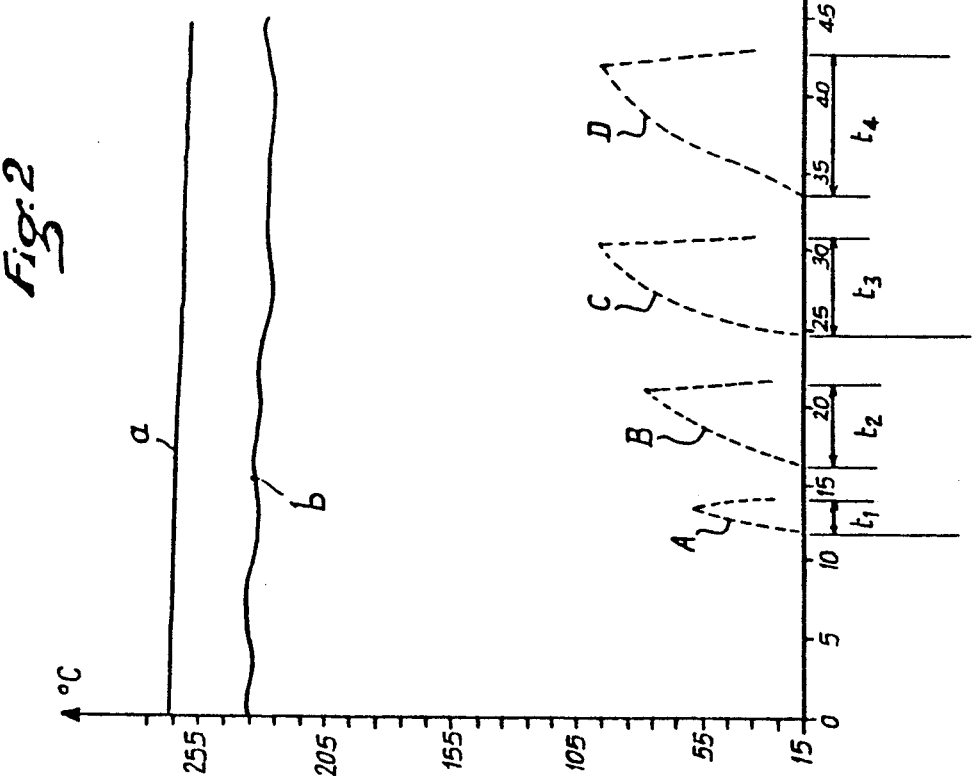
FIG. 3 is a diagram illustrating the variation of the temperature of different vegetables as a function of time.

The diagrams of FIGS. 2 and 3 give examples of results obtained with the apparatus described with reference to FIG. 1. On these diagrams, the temperature in degres Celsius is shown in ordinates while the time in minutes appears on the abscissa for the cooking of meats, vegetables and fruits. To obtain these results after prior adjustments of the power for each of resistances 21, 38 of the steam temperature increasing device 2 and of the cooking enclosure, there is adjusted for the meats a steam output of 210 g/h, a steam temperature at 260° C. (number a on the diagram of the FIG. 2) and the temperature of the cooking enclosure walls 3° to 235° C. (number b on the diagram of FIG. 2 ). For vegetables and fruits, the steam flow is adjusted to 210 g/h, the temperature of the steam is at 135° C. (number c on the diagram of FIG. 3) and the wall temperature of the cooking enclosure 3 is set at 125° C. (number d on the diagram of FIG. 3). On this example of result and construction, of the steam elevating devices makes it possible to obtain a steam temperature of 250° C. at the end of about 2.5 minutes.

For meat samples measuring about 30 by 30 mm and 12 mm thick, curve A (FIG. 2) shows the case of a flash cooked meat for which there is obtained an internal temperature of 58° C. at the end of 2 minutes (cooking time t1). This meat then resembles that obtained in a pan, it looks red on two thirds of its thickness and its taste is close to that which it has when it is eaten raw with juice loss during the cooking of the meat without allowing the appearance of carbon on its surface. Curve B shows the result obtained for the same well cooked beef whose internal temperature has been 76.7° C. at the end of the cooking time t2 to 5 minutes. The cooked meat generally looks about the same as the meat cooked in the preceeding way, it looks red on about an area corresponding to about one third of its thickness, while remaining tender and not as though it were cooked at a low temperature steam or in water. Curve C shows the cooking of a piece of pork, which does not have any fat on its inside or on its outside for a cooking time t3 to 6 minutes and a final internal temperature of 95.9° C. Curve D shows the case of the same pork sample with fat along its outside for a cooking time t4 to 8 minutes and a final internal temperature of 94.5° C. The two samples cooked in this manner are tender, with good appearance, and are not dry like it is often the case in a pan or on the grill and moreover have a pleasant odor during cooking.

FIG. 3 shows results obtained with vegetables and fruits having the size of about 40 mm by 40 mm and a thickness of 20 mm. Curve E shows the results obtained with a potato. In this case there is obtained after a cooking time t5 to 15 minutes an internal temperature of 100° C. without the potato crumbling and while retaining a persistant and sweetly pleasant taste. Curve F illustrates results obtained with a carrot sample and in this case there is obtained after a cooking time t6 to 14 minutes an internal temperature of 103.6° C. while preserving for practical purposes the appearance and the original taste of the sample which however is relatively tender and not crumbly after cooking. The curve G illustrates the result obtained with a sample of apple and in this case there is obtained, after a cooking time t7 to 4 minutes, an internal temperature of 100° C. while preserving the structure of the piece of apple and a excellent taste very close to that of the original and a good odor during cooking. This type of fruit then has been frozen then brought back to ambient temperature and the same qualities of taste and bouquet have been found therein which allows to preserve thereto a structure close to that of the original structures.

In addition to the examples of cooking above illustrated, there have been also cooked with the apparatus of the invention chestnuts, quick frozen for 6 minutes for a steam temperature of 130° C., mutton chops for 3 minutes for a steam temperature of 250° C., sausage cocktail for 5 minutes at a steam temperature of 250° C., raclette cheese for 4 minutes at a steam temperature of 250° C. and banana for 4 minutes at a steam temperature of 130° C.

| Cooking of meats | temperature: 250° C. to 260° C. | |
| --- | --- | --- |
| Beef (flank steak, rib steak) | thickness 1,5 cm, appearance rare. | time: 2 min |
| " | thickness 1,5 cm, well-done | time: 5 min |
| Pork (filet and spine) | thickness 1,5 cm, rosy appearance | time: 6 min |
| " | thickness 1,5 cm, well-done | time: 8 min |
| " | thickness 3,0 cm, rosy appearance | time: 8 min |
| " | thickness 3,0 cm, well-done | time: 10 min |
| Lamb (rib) | thickness 2,0 cm, | time: 3 min |
| Sausage cocktail | rosy appearance | time: 5 min |
| Bread baking | temperature: 220–230° C. | |
| Pre-cooked, frozen raisin bread Time: 8 to 9 min. | golden appearance | |
| baguette of bread diameter 50 mm, length 80 mm: time 9 min | | |
| Baking of cake | temperature: 180° C. to 190° C. | |
| Diameter of cylinder 5 cm, height: 6 cm (at end), time: 25 min golden appearance | | |
| Cooking of vegetables | temperature 120° C. to 130° C. | |
| Potatoes, diameter of half-sphere: 4 cm, time: 15 to 16 min well-done | | |
| Carrot slice 2,5 cm. thickness 4 cm, time: 14 min | | |
| Cooking of fruits | temperature: 120° C. to 130° C. | |
| Apple, volume ⅛ thereof | heating time: 4 min | |
| Pear, volume ⅛ thereof | heating time: 6 min | |
| Banana, diameter 2 cm, thickness 4 cm, | heating time: 6 min | |
| Frozen chestnuts, diameter 2 cm | heating time: 6 min | |

These trials have been replicated in a large oven in which similar results have been obtained with identical products while cooking other types of products. There will be given hereafter a summary of some examples of the results.

On table 1 of the following pages are given certain comparative results for cooking times of foods with an apparatus of the invention, a mini steam oven, a microwave oven and a commercial type oven.

Other cooking tests have made it possible to show the influence of different parameters on the cooking time, the loss in water of the product and its external appearance at the end of the cooking.

These different parameters are the following:
Dimension of sample
Initial humidity of sample
Steam temperature within the cooking enclosure
Temperature of the walls near the steam temperature
Steam flow within the cooking enclosure.

The diagrams of FIGS. 4 to 9 show the influence of different parameters on the cooking time, this time t being shown in the abscissas, in minutes. On these diagrams the temperature T is shown in the ordinates, in degres Celsius.

Figure 4:
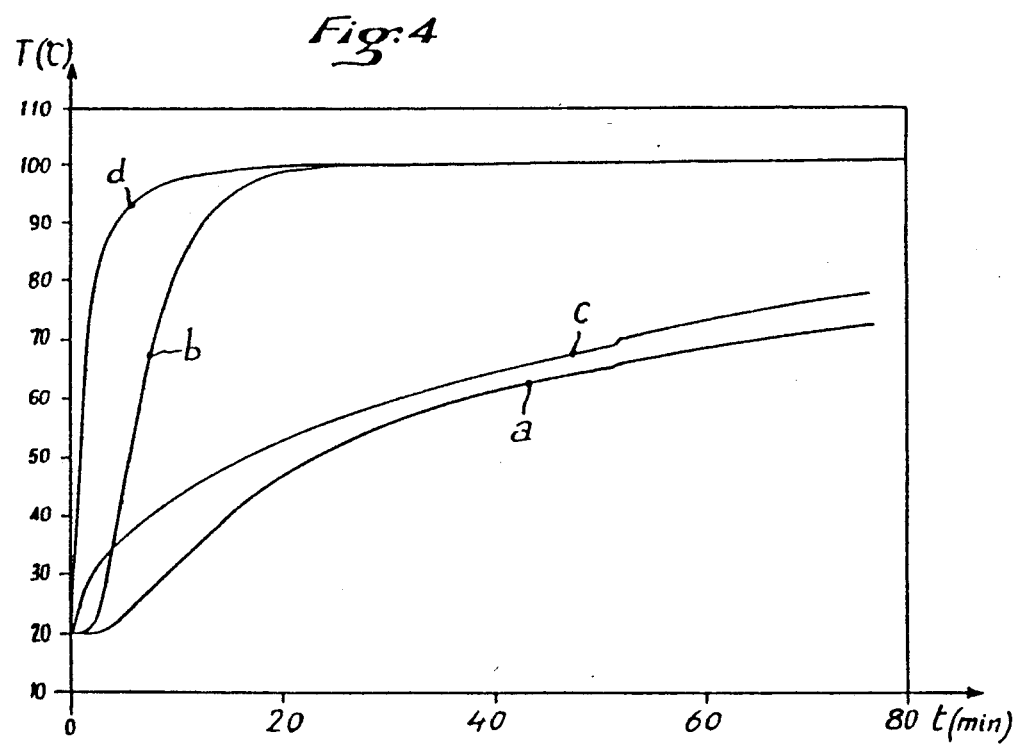
FIG. 4 is a diagram showing the influence of the presence of steam or air on the cooking temperature of a cylindrical portion of potato.

FIG. 4 shows the influence of the presence of steam within the enclosure for a cylindrical bit of potato at a ambient temperature of the enclosure (air, steam) and the walls of 130° C. Curves a and b show respectively the evolution of the temperature in the center a cylindrical portion of potato having a diameter of 33 mm at a length of 43 mm respectively with and without steam in the oven. Curves c and d show respectively the evolution of the temperature at the surface of the cylinder of the potato under the same conditions.

TABLE I

COMPARISON OF SOME EXAMPLES OF COOKING TIMES

| Type of food | Cooking means | | | |
|---|---|---|---|---|
| | Oven of invention | Steam bath | Enclosed oven or mini-oven | Microwave Oven |
| Steak | 2 mn | Not recommended | 10 mn | Cooking impossible |
| Frozen chestnuts | 6 mn | — | — | 17 mn |
| Carrots | 14 mn | 15 mn | — | Not recommended by Picard, as also: green beans, peas, leeks, artichoke. |
| Potatoes | 15–16 mn | 15 mn | — | |
| Bread | 9 mn | impossible | 15 mnn | |
| Cake | 25 mn | impossible | 45 mnn | defrosting only |
| Sausages | 5 mn | — | not recommended | 4 mn |

Figure 5:
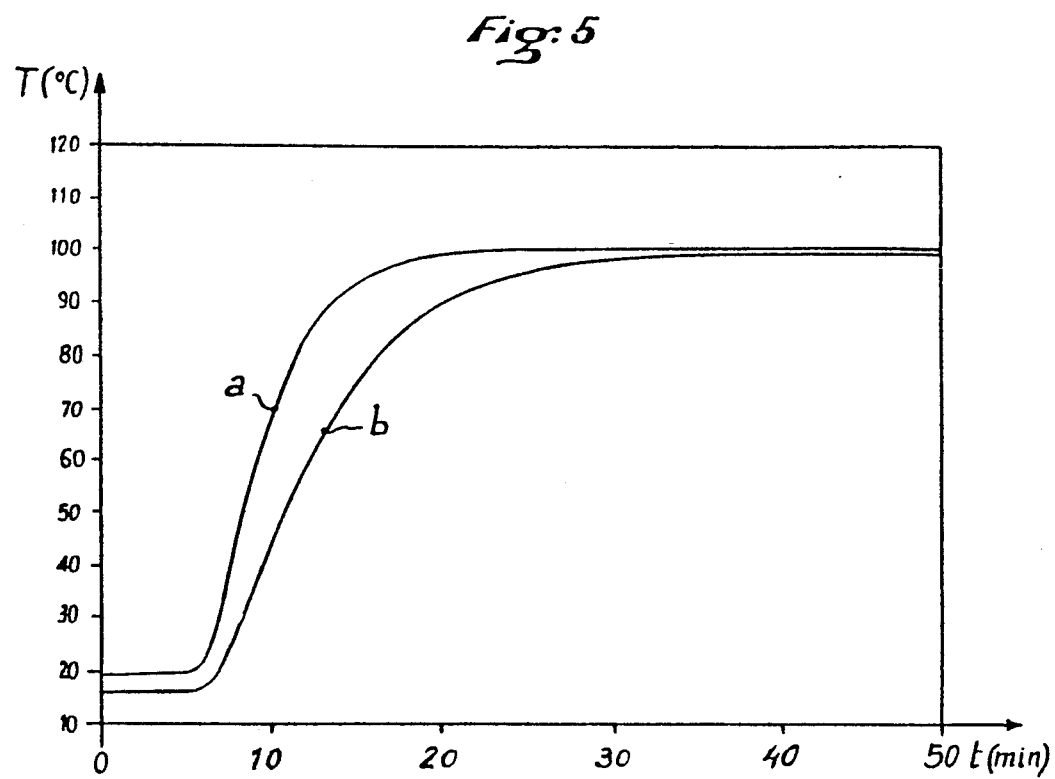
FIG. 5 is a diagram showing the influence of size on the cooking of a cylindrical piece of potato.

FIG. 5 shows the influence of the size of the sample for the cooking of a cylindrical member of potato at a steam temperature and wall temperature of 130° C. Curves a and b show respectively the evolution of the temperature at the center of two cylinders of potato having respective sizes of 34 and 43 mm in diameter and a length of 33 and 44 mm.

Figure 6:
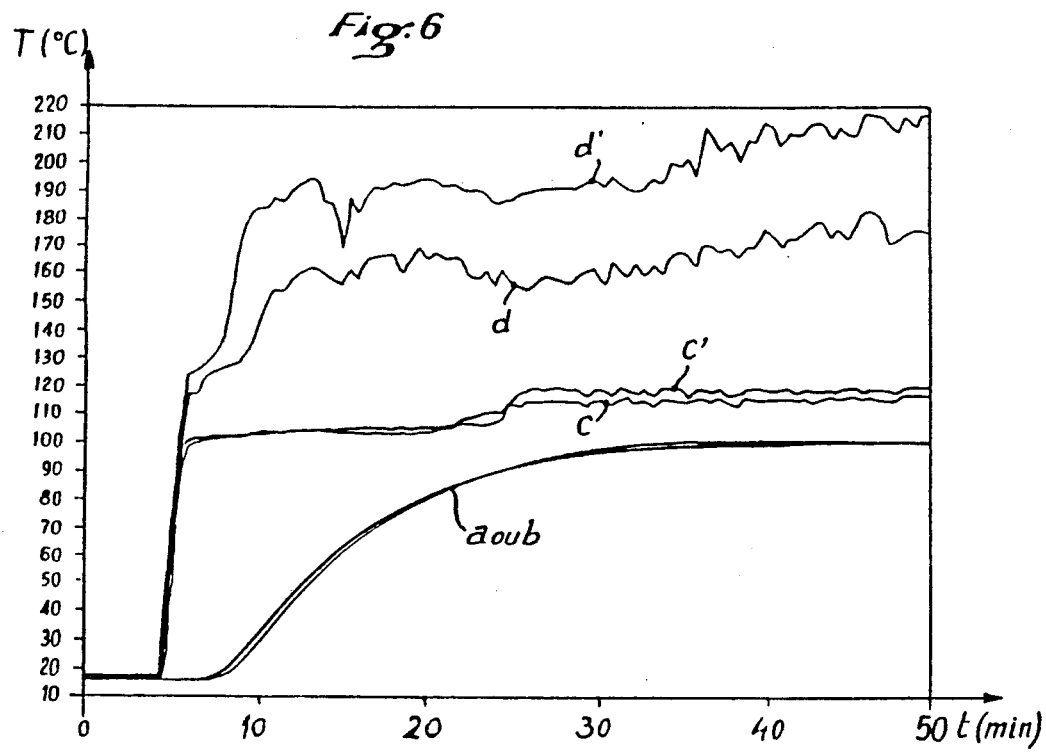
FIG. 6 is a diagram showing the influence of the temperature of the steam on the cooking temperature of a cylindrical bit of potato.

FIG. 6 shows the influence of the temperature of the steam in the cooking enclosure upon the cooking of a cylindrical bit of potato at two steam temperatures of 130° C. and 240° C., the temperature of the walls being adjusted, in each case, to a temperature near that of the steam. Curves a and b show respectively the evolution of the temperature at the center of a cylindrical piece of potato measuring 43 mm in diameter and 48 mm in length at the two temperatures cited. Curves c and c' and d and d' show respectively the evolution of the temperature at the surface of the same cylindrical piece of potato under the same cooking conditions. Curves c and d are the surface temperatures on the side of the cylinder, and curves c' and d' are the surface temperatures above the cylinder.

Figure 7:
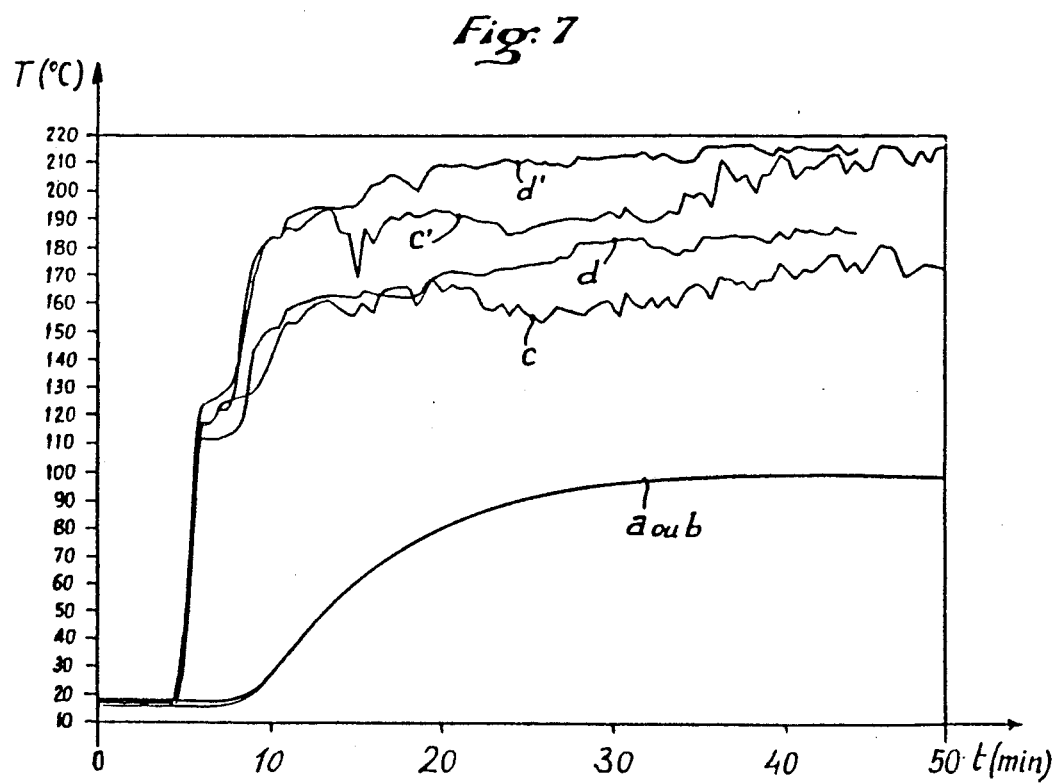
FIG. 7 is a diagram showing the effect of steam flow on the cooking temperature of a cylindrical bit of potato.

FIG. 7 shows the influence of the steam flow on the cooking of a cylindrical piece of potato, at a steam temperature of 240° C. and two steam flows of 790 and 1180 grams per hour, the temperature of the walls being adjusted to a temperature near that of the steam. Curves a and b show respectively the evolution of the temperature in the center of a cylindrical portion of potato measuring 43 mm of diameter and 48 mm of length after two cited flows. The curves c and d and curves c' and d' show respectively the evolution of the temperature on the surface of the same cylindrical portion of potato under the same cooking conditions. Curves c and d are the surface temperatures on the side of the cylinder, and curves c' and d' are the surface temperatures above the cylinder.

Figure 8:
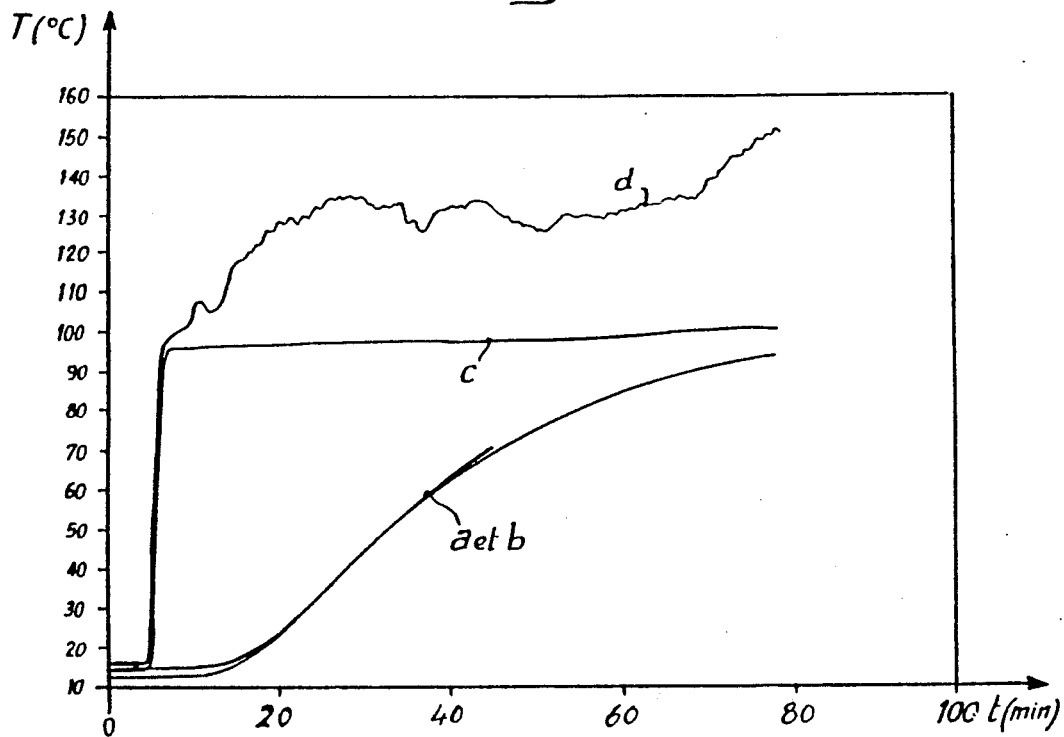
FIG. 8 is a diagram showing the influence of steam temperature on the cooking of a pork roast.

FIG. 8 shows the influence of the temperature of the steam on the cooking of a fresh roast pork of about 500 g at two steam temperatures of 130° C., and 240° C., the temperature of the walls being adjusted in each case to a temperature near that of the steam. Curves a and b show, respectively, the evolution of the temperature in the center of a roast pork measuring 63/100 mm in diameter and 100 mm in length, for the two temperatures cited. Curves c and d show, respectively, the evolution of the surface temperature of the same pork roast above the cylinder that it forms under the same cooking conditions.

Figure 9:
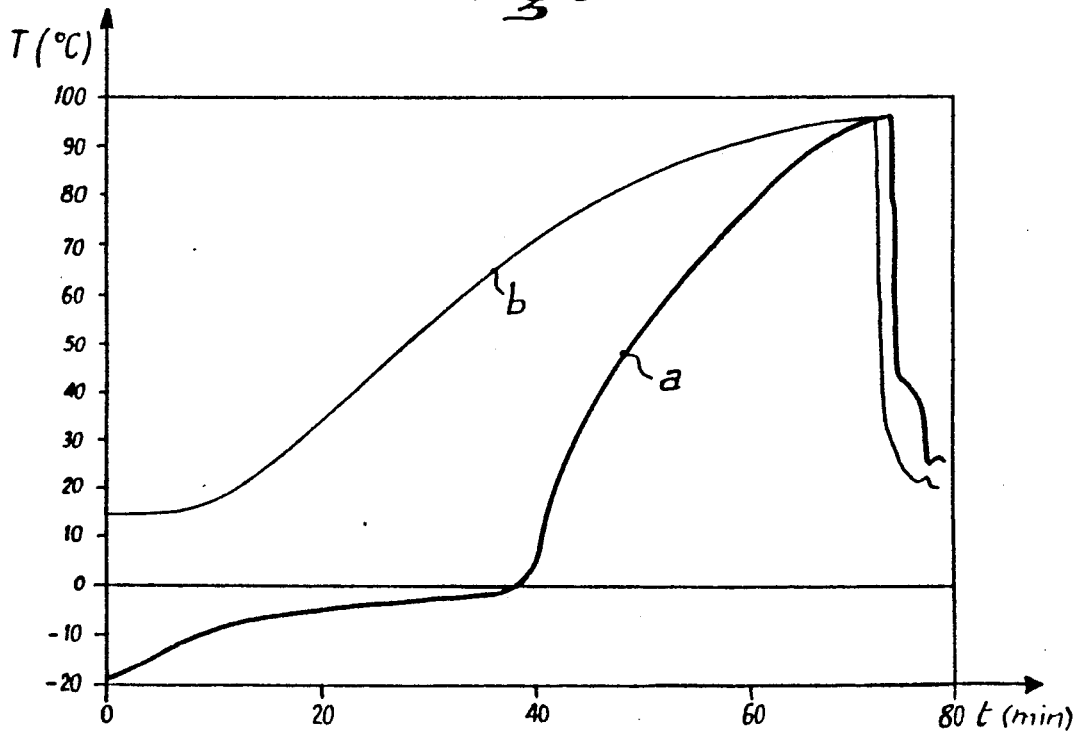
FIG. 9 is a diagram showing the influence of the temperature of the steam on a frozen roast pork.

FIG. 9 shows the influence of freezing a roast pork of about 500 g on cooking at a steam temperature of 240° C. Curves a and b show, respectively, the evolution of the temperature in the center of a frozen and fresh pork roast measuring 60/100 mm in diameter and 100 mm in length for the two temperatures indicated.

The numbered results corresponding to the curves are given in the comparative table II in the following pages with the cooking results shown as functions of the different cooking conditions.

These results make it possible to formulate the following conclusions;

Regardless of the type of food (vegetable or meat, fresh or frozen) the physical phenomenas which determine the cooking are the same.

The volume of the sample has a preponderant influence on the internal temperature of the product; at the same volume, the surface and in particular the distance from the center become important parameters.

With samples in every respect identical (nature, shape, volume), the steam temperature within the cooking enclosure has no influence on the evolution of the internal temperature of the product.

The steam temperature in the cooking enclosure has a great influence on the evolution of the surface temperature of the product; it is this temperature which determines the golden-brown appearance or absence thereof on the surface.

TABLE II

COMPARISON OF COOKING RESULTS ACCORDING TO COOKING CONDITION FOOD CYLINDER COOKING TIMES

| Cylinder diameter (cm) | Size length | Cooking vapor (g/h) | Conditions temperature (°C.) | Product temperature | | Internal cooking time (minute) | Loss of weight (%)/M. Start |
|---|---|---|---|---|---|---|---|
| | | | | Internal (°C.) | Surface (°C.) | | |
| 34 | 33 | without | 130 | 60 | 63 | 37 | |
| | | with | 130 | 60 | 100 | 7 | |
| | | 790 | | 80 | 100 | 10 | |

TABLE II-continued

COMPARISON OF COOKING RESULTS ACCORDING TO COOKING CONDITION FOOD CYLINDER COOKING TIMES

| Cylinder diameter (cm) | Size length | Cooking vapor (g/h) | Conditions temperature (°C.) | Product temperature Internal (°C.) | Product temperature Surface (°C.) | Internal cooking time (minute) | Loss of weight (%)/M. Start |
|---|---|---|---|---|---|---|---|
| 43 | 48 | with 790 | 130 | 100 | 100 | 23 | |
|  |  |  |  | 60 | 100 | 10 | |
|  |  |  |  | 80 | 100 | 16 | |
|  |  | with 790 | 240 | 100 | 100 | 33 | 7 after 80 mn |
|  |  |  |  | 60 | 180 | 10 | |
|  |  |  |  | 80 | 180 | 16 | |
|  |  | with 240 | 240 | 100 | 180 | 33 | 21 after 90 mn |
|  |  |  |  | 60 | 180 | 10 | |
|  |  | with 1180 |  | 80 | 185 | 16 | |
|  |  |  |  | 100 | 200 | 33 | 28 after 44 mn |
| 60/100 | 100 | with 790 | 130 | 95 | 100 | 70 | 25 after 80 mn |
|  |  | with 790 | 240 | 95 | 120 | 70 | 34 after 80 mn |
| 77/80 | 113 | with 790 | 130 | 95 |  | 80 | 36 after 80 mn |
|  |  | with 790 | 240 | 95 | 100 | 80 | 38 after 80 mn | with equal steam temperature, the increase in the vapor flow makes it possible to increase the surface temperature of the food, and therefore the drying speed thereof. It is noted then that the selection of the cooking temperature has a part only with respect to the type of surface that is desired. Besides, it is noted that the golden appearance of the foods is obtained only after drying of the surface. Since the volume of the product to be cooked strongly influences the evolution of the temperature within the center, if the same temperature is used for two samples having a different volume, there is danger that the surface of the larger sample be dryer, and consequently that the quality of the cooked product not be as good.

However, since it has been noted that for the same volume, the steam temperature has no influence on the cooking time, it remains to adapt this steam temperature in function of the volume of the samples in order to obtain the same cooking conditions. The approach consists in determining the nature of the type of surface wanted by the consumer.

To conclude, it appears that cooking food with steam can be made at a low temperature during a certain time then if it is desired to obtain a golden surface, it is necessary to increase the steam temperature in such a way that the diffusion of the water toward the surface be largely compensated by the evaporation thereof. This new type of cooking has many advantages:

The possibility of adapting the conditions of cooking on the basis of physical parameters of the sample (nature, volume, surface, humidity) in order to obtain a constant quality.

By controlling the difference in temperature between the inside and the surface of the food, it is possible to act upon the adjustment of the oven (outlet temperature of the heater, wall temperature, vapor flow) to obtain the desired type of surface at the desired moment; the food no longer is subjected to the cooking conditions, it determines them as a function of its characteristics.

Energy savings due to the use of a low temperature for the major part of the cooking.

Economy in material by decreasing weight loss limited to the formation of a crust which no longer depends on the total cooking time.

For certain cooking conditions, in particular in cooking the inside of roasts for example, it is possible to do without preheating the oven since, owing to the use of steam, it is possible to obtain very rapidly 100° C., the transitory period of the steam generator being very short. In a parallel fashion, heating the walls and the heater make it possible to eliminate condensation of vapor on the walls.

Rapid modification of cooking conditions by optimizing the inertia of the system. Use of a steam generator, having a porous body, is one of the main advantages of the process since it makes it possible to have transitory period which are very short and an easy adjustment of the vapor flow.

These inventive results can be obtained by the design of devices of all types suitable to the aims sought, functioning under atmospheric pressure with steam together with mixtures or not of ambient air or any other inert gas, when cooking must take place at a temperature below 100° C.

The device for increasing the steam temperature can be located, for example, within a cooking enclosure, maintained in temperature, or be integrated therewith, partially or totally, or still, this device can be by itself a cooking enclave enclosure or still can be a steam central distributing steam at one or more temperatures.

To obtain an increase in the steam temperature, there may be used all types of energies, for example, electricity, or still, for example, combustion gases. Similarly, there can be used, to feed the device for increasing the steam temperature, all sorts of steam generators producing the same with all types of energies.

To cause the transfer of the energy used in order to increase the temperature of the steam and of its possible mixtures, it is possible to locate the heating element, such as the resistance 22, partially or totally, within the length of steam conduit 19, 21, 29, directly in the passage area of the steam flow, or, for example, the heating element can be integrated with the wall of the conduit, or still, the heating element can be placed on the outside surface of the steam conduit.

The heating element can be, for example, a bare wire, a covered resistance, or a quartz tube or still a wall which conducts the combustion heat of a gas or a source of thermal radiation.

The steam conduit can be, for example, of a circular square or other cross section, this cross section being related with the length in proportion to the yield desired and the necessary configuration. This steam conduit can be placed between two cylindrical pieces or having another suitable form, between which the steam circulates. It is possible to provide, for example, a double walled cooking enclosure one of which, or the two, are heated to the required temperature. This steam conduit can be perforated by one or more holes, for the entering steam as well for that leaving, increased in temperature, in such a way that it is possible, to obtain, if desired, a slight excess pressure when it is desired that the steam reach directly the food to be cooked or to be reheated. The steam conduit can be also a steam distributor. In this case, it can be equipped with a heating element, on the whole or part of its surface, or within it thus becoming a device wherein are combined two functions in one. Similarly, the apparatus can have several derivations, each of which can be heated locally or continuously.

In order to better understand the capabilities of the invention in the various fields of use previously mentioned, and in order that the same be adapted specifically to certain operations, to sizes and appropriate shapes, and to obtain a maximum efficiency with respect to energy and time, temperatures and type of cooking required, there will be described hereafter certain non-limiting examples of design and application of the invention to apparatus whose applications are known in various commercial sectors.

In commercial sectors, in utilities and in front of the displays of butcher shops and delicatessens, there are found apparatus used for cooking broilers which are made up of several levels. The broilers, most of the time, are exposed while rotating to infra-red radiation for example, from several quartz tubes. In this example, it is possible advantageously to replace these quartz tubes by different embodiments of the invention. For example the steam distributor can be a simple tube perforated with holes enabling the projection of steam directly onto the surface of the broilers, while these rotate, and thus made, it can be put in the same place as the quartz tubes. Such a distributor, which is shown on FIG. 10, consists of a stainless steel tube 66, perforated with holes 67, to which is soldered tube 68 for steam inlet. In the axis of tube 66 extends the electric resistance 69 of the covered type each of whose ends is soldered to two ends 70, 71 of tube 66 and whose external terminals 72, 73 are connected to a source of electrical current.

In the modification shown on FIG. 11, the steam distributor consists of two semi-cylindrical coaxial half-shelves 74, 75 united and soldered one to the other at their extremities by squares 76, 77 thus forming a semi-cylindrical container. Within the internal space 78 of the semi-cylindrical container are housed several resistances 79 of the covered type, which extend longitudinally. In this space issues tube 80 which supplies steam and this steam comes out of the container by passing through a series of holes 81 perforated within the internal semi-shell 74. On a skewer 82, which extends substantially along the axis of the two semi-cylindrical half-shelves 74, 75, is mounted a broiler 83 to be roasted which can thus rotate regularly at a distance from the internal semi-shell 74, while being progressively cooked by the steam issuing from holes 81. To increase the heating speed or to decrease the energy consumption it is possible to provide, o° the other side of the semi-cylindrical container constituted by the half-shelves 74, 75, another similar container arranged in such a way as to completely enclose the broiler 83. In the case of the three examples previously mentioned, these types of distributors can be fed by a central device for increasing the temperature, or it is possible to equip each type of ramp described with heating elements and to thereby program for example, a preheating cycle on one or more ramps according to the needs of the required yield. According to the quality sought, it is possible to play upon the steam yield in relation with the temperature thereof. Similarly, when the ramp of the vapor distributor is provided with a heating element, it is possible to program the quality sought by combining the temperature and the vapor and the steam yield. For all of these embodiments it is possible to make apparatus having a thinner size owing to the possibility of placing the steam source extremely near the surface of the broilers to be cooked.

Still within the area of retail, there are found in the displays of bakeries or pastry-shops cooking ovens for biscuits for example, for cooking from prepared dough, croissant, breads containing chocolate, apple-tarte, etc.. These ovens generally work with pulsating air issuing from a small central equipped with a resistance and a blower. Similarly it is possible to improve these apparatus by equipping them according to the invention, by locating steam distributors stepwise or by using a central for elevating the temperature of the steam. If there are used stepwise steam distributors equipped respectively with heating elements, it is possible, in this case to provide temperatures adapted to the types of products to be cooked within the entire range proposed, thus bringing a much better service to the clientele, and economizing while obtaining a greater yield per machine. Proceeding in the same area of client service, in bars, in order to cook or reheat for example hot-dogs, or pizzas, there are used enclosures having infra-red tubes or microwave ovens. In the first case, cooking is relatively long and in the second the quality is disappointing. It is possible to improve performance in this type of machines, using the invention by using the concept of the different machines above described.

In the large consumption household business, it is possible to use the apparatus with machines whose operations are known, for example, for making a "fondue bourguignonne" where the approches is to cook pieces of meat in fat or boiling oil. In this case, it is possible advantageously to replace this hot oil by exposing the meat to a steam temperature for example at to 250° C. FIG. 12 shows an embodiment of a machine making possible this type of cooking. This machine comprises a body 87 in which is located a steam generator 88 which feeds a device 89 according to the invention, which comprises a resistance 91 distributing vanes 92. This device distributes steam, of a high temperature, through tubes 93, 94 which issue to two cooking enclosures 95, 96 equipped respectively with heating collars 97, 98 and forming part of separate stations. The apparatus shown in FIG. 12 comprises as many cooking stations as desired, each of these comprising, at its upper part, a cooking enclosure such as enclosures 95, 96. It comprises also, in its lower part, a horizontal plate 98', which can be lowered or raised by means of a lever 99, and on which can be placed a plate 101 having an handle, plate in which is placed the piece of meat to be cooked. Contrarywise to the machines using hot oil, while the temperature decreases rapidly, with the use of the invention the steam temperature is not influenced by the environment of the meat. By making orifices in glass, it is possible to see the evolution of the appearance of the meats, and according to the desire of the consumer, by equipping a part of the surface of the steam distribution tube of a independent heating element, each consumer can adjust the temperature of the steam according to the goal sought, by adjusting, for example, electronic devices.

In the same household area, it is also possible to obtain the same type of product with cheese fondues by using the type of approach of the "fondue bourguignonne", the scoops being able to change into containers adapted to the desired cooking volume.

Also, in this household application, bearing in mind that the steam issuing is at a moderate temperature, in front of the radiation of electrical resistance, it is possible to make many micro ovens dishes intended more particularly for the dishes that are found in particular as frozen. For example, the height can be 10 cm, and the other dimensions near the maximum among all these types of products. On the side, it would be possible to house the steam generator and the entire control system of the oven. According to the prices aimed at, it is possible to bring the steam simultaneously to upper and lower parts by using steam distributors or only simple holes. The enclosure, itself, would be equipped with heating elements and programmed as regards temperature. In addition to reheating already prepared dishes, it is possible also to cook croissants with the dough already prepared or another pastry, and also to cook meats.

Abother advantage of the invention can be included with a micro-oven. In fact, most of these have a part of their enclosure of plastic. To improve them, bearing in mind that this material can hold up to a relatively high temperature, it is possible to use the invention in order to increase the range of feasibility of the machine. Similarly, it is possible to increase the performance of sauce ... as well as that of encasable ovens.

Within the field of application of industrial operation, for example, within some lines of preparation or within ovens, it is possible to use the coupling of a steam distributor and of its heating element for example for baking bread. In this case, there is made a device having a shape corresponding to that of the bread, or a group of breads, and whose enclosure has a double wall, one of which is perforated with outlet holes for the steam localized in such a way that it be possible to have cooking color variations at different spots on the surface. As in the previous examples, it is possible to program this cooking according to the appearance and quality desired.

In commercial applications, for example for cooking ham which is an operation relatively long, it is possible to make cooking enclosures having the size of a ham or of a group of hams. FIG. 13 shows an example of machine made for this purpose and which comprises an enclosure for internal cooking 102, which is bell-shaped, and equipped on its outlet surface, with an electrical heating element 103 (resistance). This internal cooking enclosure 102 is surmounted, at a certain distance, by another external enclosure 104, which bears, on its external surface, an electrical heating resistance 105. The two enclosures 102 and 104, thus define, therebetween, a conduit 106 which communicates with a conduit 107 for supplying steam. This conduit 107 issues into the horizontal upper surface of the external enclosure 104. Besides the apparatus comprised a base 108 which is provided with a sealing joint 109, interposed between base 108 and an external lower collar 102a, forming part of the internal enclosure 102. This collar is also provided, in its turn, along its periphery, with sealing joint 111 on which rests an external lower collar 104a forming part of the external enclosure 104. The lateral wall of the internal enclosure 102 is provided with grooves 112 for passage of the steam. Within the lower part of the internal cooking enclosure 102 extends a cylindrical wall 113 which is welded near a welding area 114, to base 108 which has a central opening to which is connected wall 113. Finally, an external envelope, bell-shaped, surrounds the external enclosure 104, to insure thermal insulation, it rests upon base 108 through a lower external collar 115a, and its horizontal upper part is traversed by the steam inlet tube 107.

Steam arriving in the machine through upper vertical tubes 107 flows along the path indicated by the arrows on FIG. 13. This steam flows first horizontally, then vertically downwardly into the conduit formed between the two enclosures 102, 104. During this flow, the steam is heated by contact with the walls of the two enclosures 102, 104, which are respectively heated by resistances 103, 105. When it reaches the lower part of conduit 106, the steam passes through the cuts 112, in the annular space comprized between the lateral wall of the internal cooking enclosure 102 and cylindrical wall 109, it then goes up into this annular space to spread to the top of the cooking enclosure 102. If in this embodiment, wall 113 directs the vapor flow toward the top of the cooking enclosure 102, there can be conceived, according to a modification, another cooking enclosure perforated with openings along its entire surface. Thus using a slight excess pressure, it is possible to force steam directly on the entire surface.

In the restaurants, one of the advantages of the invention among others is that it is possible to make one and the same oven which can do many things, by using a steam distributor equipped, or not, with a heating element, which distributes and allocates the steam at different temperatures according to the types of cooking to be effected, stepwise, and for each step. By this mean, it is possible to obtain a multi-purpose oven which can be programmed according to the places and the types of products to be cooked, the waiting positions of cooking or reheating or still, of surface appearance by adjusting the temperatures and the steam flow according to the nature and quality of the product desired by the clientele. Through these possibilities, it is possible to make a range of ovens of every power and size which can be adapted from small scale to large scale restaurants.

On FIG. 14 is shown schematically a cooking oven 163, whose enclosure is provided with heating resistance 115 and maintained at a constant temperature by a temperature probe 165, which controls an electric feeding source 117, for feeding, through connection 118, heating resistance 115. Within the enclosure of oven 163 are positioned three steam distributors 119, 120, 121, fed respectively by three devices for increasing the steam temperature 122, 123, 124, themselves fed by steam through tubes 125, 126, 127. Each of these devices 122, 123, 124, is equipped with a heating resistance supplied in electricity by connections 128, 129, 130, controlled by a device 131 operated by a servo device 132 for programming adjusting and finely adjusting and which receives the connections from temperature probes 133, 134, 135, noting respectively the temperature of the steam in the three devices for increasing the temperature 122, 123, 124. Each of these devices for increasing the temperature 122, 123, 124, is fed by steam from a tube 136 connected to a steam generator 137, controlled in electricity by a servo apparatus 138, through a connection 139, and fed by water through a tube 140. Within the enclosure of the cooking oven 114 are positioned three plates 141, 142, 143, which receive foods to be cooked respectively 144, 145, 146, each of which has a respective temperature probe 147, 148, 149, these probes being connected to a controlled device 150. In this embodiment, the steam distributor 121, located at the lower part of the enclosure receives a mixture of steam and gas, or air, coming from the device for raising the temperature 124, which is equipped with an inlet 151 fed a gas or air generator 152, whose flow is servo control by the device 153. Thus conceived, the food to be cooked 146 can receive the mixture of steam and gas or air in such a way that it is possible to cook the food at temperatures below 100° C.

The arrangement thus conceived makes it possible, through the device 150, to impose a manual or automatic cycle through probes 147, 148, 149, which respectively measure the temperatures within the different foods. If it is desired to manually control cooking, the program is posted by means of device 132, the temperature desired in the enclave controlling through a connection 154, the heating servo device within enclosure 117, and the steam flow controlling through connection 155 a servo device 138, the temperatures desired for the steam provided by the temperature raising devices 122, 123, 124, to control, through connections 156, 157, 158, the servo device 131, and finally the gas flow to control through a connection 159, the servo device for the gas or air generator 152.

If it is desired to cook under automatic mode, it is the temperature probes 147, 148, 149, housed in the respective foods which will control, relative to a selection of programs according to the type of foods to be cooked, the servo control of device 117 which provides heating to the walls of the enclosure, the steam generator 137, the servo heating device 131 for the steam conduits and the servo device 153 for gas flow.

If in this last example there is used only one temperature probe 147, 148, 149, housed inside, the food and that it is desired, for example, to create a particular and reproducible recipe, it is possible to house a second tempetature probe inside, and near the surface of the food, which will trigger, by selection of program 131, the surface look cycle of the food by raising the steam temperature.

The different types of machine described above show that the design thereof can differ a little according to function: that is to say that in order to satisfy all types of cooking, it is possible to make either a multi-purpose machine or a machine which is specific and to the cooking desired therefor.

For these different machines, it is advantageously possible to obtain a temperature range of 50 to 300° C., in such a way as to make possible either low temperature delicate cooking such as for example that of sugary desserts or spring vegetables, or high temperature dishes, at relatively high temperature, or still a combination of the two, when it is desired to retain certain qualities of the products or to obtain a certain treatment. In every case, it is possible to control the different types of cooking either manually, or by a program preestablished by the manufacturer, or by a program desired by the user before or during cooking or still by controlling the temperature of the food itself which will determine the ideal cooking conditions in function of the quality and cooking criteria indicated by the user.

In every type of cooking there will be noted two principal requirements which are to reach the internal temperature and to obtain the desired surface condition. In optimizing cooking, the aim is to reconcile the two requirements while minimizing losses in quality of the food (water loss for example). In effect, in certain cases, roasts for example, to obtain an acceptable surface condition characterized by the thickness and the color of the crust, it is often necessary to increase the oven temperature: owing to this fact the losses by evaporation are considerably increased without by the same token decreasing the cooking time. Since most often, the time required to increase the temperature is greater than the time required for forming the surface condition, it is possible to conceive the cooking procedure as follows, a first cooking phase at a low oven temperature, comprised preferably between 100° C. and 130° C., in the attempt of cooking the food while minimizing evaporation losses, then a second cooking phase at a high temperature, preferably greater than 200° C., in order to finish the cooking of the food and to favor formation of a crust.

The aim of the programming is to determine either in advance or during the cooking, the opportune moment for passing from the first to the second phase of cooking which is determined in such a way as to obtain, simultaneously at the end of the cooking, the internal temperature and the surface condition desired and accordingly to minimize losses of the quality of the food in function of its physical caracteristics, such as for example volume, surface, weight and initial water content for example. These two cooking phases are characterized by conditions of adjustment of parameters of operation of the oven which are the steam temperature, the temperature of the enclosure walls adjusted preferentially near the steam temperature and finally the vapor flow. The vapor flow must be, in a first phase, as great as the drying time is short and in a second phase this flow is smaller.

Besides it is also possible to program the steam temperature and flow to clean the oven, after the end of the cooking operation. Similarly, to rapidly lower the temperature of the oven walls it is possible to spray fresh water on the walls.

We claim:

1. A process for cooking an alimentary substance within a walled enclosure under atmospheric pressure by means of steam entering into said enclosure comprising:

a first cooking step comprising rapidly increasing the temperature of the surface of said substance by means of superheated steam to preheat the substance, said steam being supplied into said enclosure at a temperature above the boiling temperature of water and under atmospheric pressure; and a second cooking step comprising drying the surface of said substance and cooking it, in continuation of the first step, by increasing the temperature of said steam entering into said enclosure to above about 130° C., while heating the walls of said enclosure to a temperature above the boiling temperature of water.

2. The process according to claim 1, including during said first step, introducing said steam into said enclosure at a temperature of between about 100° C. and 130° C.

3. The process according to claim 1, including during said second step, heating the walls of said enclosure to a temperature substantially equal to that of said steam entering into said enclosure.

4. The process according to claim 1, wherein at least one of steam temperature, enclosure wall temperature and steam flow for each of said first cooking step and said second cooking step is determined according to the difference between the temperature in the core of the alimentary substance and the temperature close to the surface of the alimentary substance.

5. The process according to claim 4, wherein at least one of steam temperature, enclosure wall temperature, and steam flow is controlled to obtain a desired predetermined final color appearance of said alimentary substance.

6. The process according to claim 4, including using two probes to obtain the difference of temperature conditions, one of said probes being disposed in the core of said alimentary substance and the other of said two probes being disposed close to the surface of said alimentary substance.

7. The process according to claim 1, wherein at least one of steam temperature, enclosure wall temperature and steam flow is controlled by an automatic control device.

8. The process according to claim 1, wherein at least one of steam temperature, enclosure wall temperature and steam flow is manually controlled.

9. The process according to claim 1, wherein at least a part of the heating process is carried out with a steam flow ranging from about 10% to 100% of the nominal flow rate of a steam generator.

10. The process according to claim 1, wherein, during said first cooking step, the supplied steam is mixed with a gas to obtain a steam-gas mixture below the boiling temperature of water.

11. The process according to claim 10, wherein said gas is air.

12. A process for cooking a thermally sensitive alimentary substance within a walled enclosure under atmospheric pressure by means of steam entering into said enclosure, comprising:
a first cooking step comprising rapidly increasing the temperature of the surface of said thermally sensitive alimentary substance by means of superheated steam to preheat the substance, said steam being supplied into said enclosure at a temperature above the temperature of boiling water and atmospheric pressure; and
a second cooking step comprising drying the surface of said thermally sensitive alimentary substance and cooking it, in continuation of the first step to completion, by entering a mixture of steam and gas, at a temperature below the temperature of boiling water, and heating the walls of said enclosure to about the same temperature as said entering mixture of steam and gas.

13. The process according to claim 12, wherein said gas is air.

14. The process according to claim 12, wherein, during said first cooking step, the supplied steam is mixed with a gas to obtaining a steam-gas mixture below the boiling temperature of water.

15. The process according to claim 14, wherein said gas is air.

16. The process according to claim 12, wherein at least one of steam temperature, mixture temperature, enclosure wall temperature, steam flow and mixture flow is determined according to the difference between the temperature in the core of said thermally sensitive alimentary substance and the temperature close to the surface of said thermally sensitive alimentary substance.

17. The process according to claim 12, wherein at least one of steam temperature, mixture temperature, enclosure wall temperature, steam flow and mixture flow is controlled to obtain a desired predetermined final color appearance of said thermally sensitive alimentary substance.

18. The process according to claim 12, wherein at least one of steam temperature, mixture temperature, enclosure wall temperature, steam flow and mixture flow is controlled by an automatic control device.

19. The process according to claim 12, wherein at least one of steam temperature, mixture temperature, enclosure wall temperature, steam flow, and mixture flow is manually controlled.

20. A process for cooking a pre-cooked alimentary substance within a walled enclosure under atmospheric pressure by means of steam entering into said enclosure, comprising:
a first cooking step comprising rapidly increasing the temperature of the surface of said pre-cooked substance by means of superheated steam to preheat said substance, said steam being supplied into said enclosure at a temperature above the boiling temperature of water, and under atmospheric pressure; and
a second cooking step comprising drying the surface of pre-cooked substance and bringing the cooking to completion, by increasing the temperature of said steam entering into said enclosure above about 130° C., and heating the walls of said enclosure to a temperature above the boiling temperature of water, and controlling at least one of the steam temperature, duration of the second step, enclosure wall temperature and steam flow to obtain a desired predetermined color appearance of the outer surface of the pre-cooked substance.

21. The process according to claim 20, wherein said at least one of the steam temperature, duration of the second step, enclosure wall temperature and steam flow is determined according to the difference between the temperature in the core of said pre-cooked substance and the temperature close to the surface of said pre-cooked substance.

22. The process according to claim 20, wherein said at least one of the steam temperature, duration of the second step, enclosure wall temperature and steam flow is controlled by an automatic control device.

23. The process according to claim 20, wherein said at least one of the steam temperature, duration of the second step, enclosure wall temperature and steam flow is manually controlled.

* * * * *